United States Patent [19]

Steinhart

[11] Patent Number: 5,731,566
[45] Date of Patent: Mar. 24, 1998

[54] DEVICE FOR WELDING AND/OR CUTTING

[75] Inventor: Wilhelm Steinhart, Friedberg, Germany

[73] Assignee: Kuka Schweissanlagen + Roboter GmbH, Augsburg, Germany

[21] Appl. No.: 669,281

[22] PCT Filed: Dec. 13, 1994

[86] PCT No.: PCT/EP94/04127

§ 371 Date: Nov. 7, 1996

§ 102(e) Date: Nov. 7, 1996

[87] PCT Pub. No.: WO95/16540

PCT Pub. Date: Jun. 22, 1995

[30] Foreign Application Priority Data

Dec. 14, 1993 [DE] Germany ............... 9319146 U

[51] Int. Cl.⁶ ........................................ B23K 26/00
[52] U.S. Cl. ........................... 219/121.63; 229/44.3
[58] Field of Search .................. 219/121.63, 121.67, 219/121.64, 121.83, 121.72, 86.22, 86.61; 228/44.3

[56] References Cited

U.S. PATENT DOCUMENTS

| | | | |
|---|---|---|---|
| 4,733,048 | 3/1988 | Clayton, Jr. | 219/121.81 |
| 4,840,303 | 6/1989 | Fujii et al. | 219/121.63 |
| 5,142,118 | 8/1992 | Schlatter | 219/121.63 |
| 5,266,770 | 11/1993 | Noé | 219/121.63 |
| 5,324,913 | 6/1994 | Oberg et al. | 219/121.63 |
| 5,614,112 | 3/1997 | Peru et al. | 219/121.63 |

FOREIGN PATENT DOCUMENTS

| | | |
|---|---|---|
| 491242 | 6/1992 | European Pat. Off. |
| 2 443 899 | 7/1980 | France. |
| 2636554 | 3/1990 | France. |
| 2678193 | 12/1992 | France. |
| 60914 | 3/1968 | German Dem. Rep. |
| 42 21 092 A1 | 3/1993 | Germany. |
| 42 07 011 | 9/1993 | Germany. |
| 42 07 016 | 9/1993 | Germany. |
| 42 07 017 | 9/1993 | Germany. |
| 2 255 924 | 11/1992 | United Kingdom. |

*Primary Examiner*—Geoffrey S. Evans
*Attorney, Agent, or Firm*—McGlew and Tuttle

[57] ABSTRACT

The present invention pertains to a device for welding and/or cutting, especially for laser welding, with a welding head 7 and with a surrounding holding-down device 6 for pressing on a workpiece 4, 5. The welding head 7 is fastened to the hand of a manipulator 2 by means of a mounting bracket 9, wherein the welding device 1 has an equalizing device 13 with an at least uniaxial drag bearing 14 for determining and correcting angle errors between the workpiece 4, 5 and the holding-down device 6. The drag bearing 14 has one or more rails 15 and at least one beating cap 20 with a plurality of rolling bodies 16 arranged between them in an arc. The rails 15 are arranged on the mounting bracket 9, and the beating cap 20 is arranged on the holding-down device 6.

17 Claims, 3 Drawing Sheets

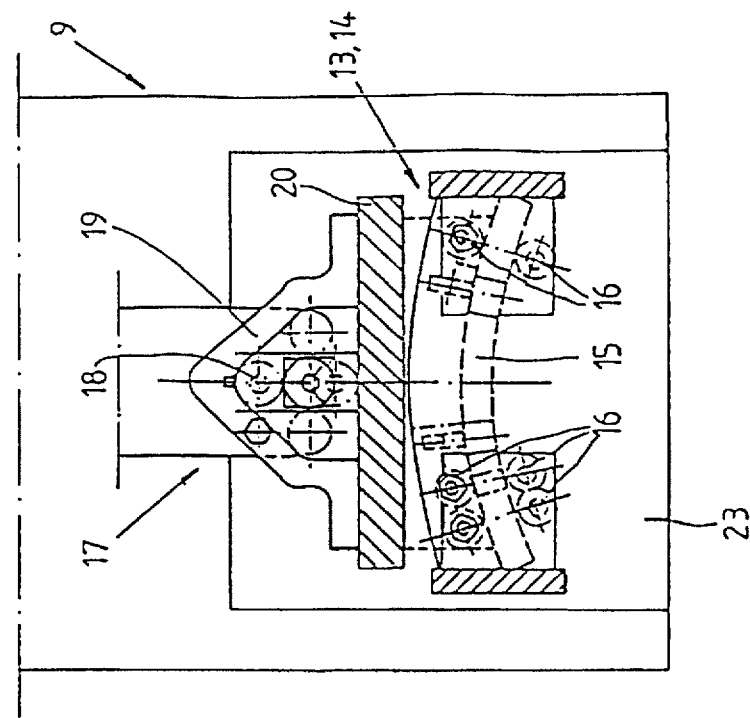
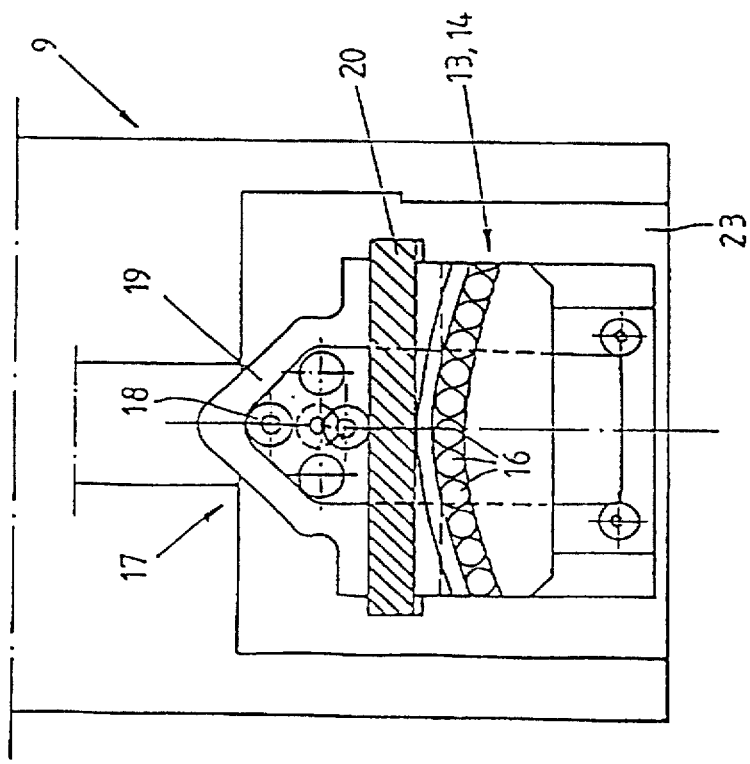

DEVICE FOR WELDING AND/OR CUTTING

FIELD OF THE INVENTION

The present invention pertains to a welding or cutting device, especially for laser welding or the like, with a welding head and a surrounding holding-down device for pressing on the workpiece.

BACKGROUND OF THE INVENTION

Such a manipulator-guided welding device has been known in practice. It has a welding head in the form of a laser head, which is surrounded by a holding-down device and is mounted and centered within the holding-down device. The holding-down device is pressed onto the workpiece, and counterpressure is optionally applied from the other side with a pressure pad when a plurality of workpieces are welded together. The holding-down device and optionally the pressure pad are fastened to the hand of a manipulator by means of a mounting bracket. FR-A 2 678 193 shows a manipulator-guided welding device with a laser welding head, which is surrounded by a tubular holding-down device. The holding-down device can be elastically pressed onto the workpiece by means of a spring-loaded straight guide and it can thus elastically yield in a vertical direction. The direction of yielding coincides with the direction of the exiting laser beam. It has also been known from this document that the holding-down devices can be allowed to rotate around the axis of the laser beam. The equalization of angle errors in the case of an oblique contact between the holding-down device and the workpiece or in the case of surface defects of the workpiece is consequently impossible here.

It was found in practice that there are problems with the quality of welding if component tolerances and inaccuracies in tens, ion occur.

SUMMARY AND OBJECTS OF THE INVENTION

The object of the present invention is to provide a welding device with which better and more constant quality of welding can be achieved.

The present invention is a device for welding and/or cutting which includes a welding head and a holding-down means partially surrounding the welding head. The holding-down means presses on the workpiece. The present invention also includes a manipulator with a manipulator hand and a mounting bracket connected to the manipulator hand. The welding head and the holding-down device are connected to the manipulator hand via the mounting bracket. An equalizing means is connected to the welding device for determining angle errors between the workpiece and the holding-down means. The equalizing means also corrects angle errors between the workpiece and the holding-down means.

It was recognized in the present invention that one cause of the previously impaired quality of welding is to be sought in an insufficient pressing of the holding-down device to the workpiece or workpieces. The present invention therefore suggests an equalizing device, with which possible angle errors between the workpiece or workpieces, on the one hand, and the holding-down device, on the other hand, are determined and corrected. A flat and uniform pressing of the holding-down device and consequently a better quality of welding are thus guaranteed, with adaptation to the surface of the workpiece.

If the welding device has a pressure pad, this may also be connected to the equalizing device, or it may have a separate equalizing device.

Only the holding-down device moves in one embodiment of the equalizing device, while the welding head is stationary, and its position is determined extensively by the feed. However, the equalizing device may also be designed such that the holding-down device moves together with the welding head and adapts itself to the surface of the workpiece. The association between the holding-down device and the welding head, and consequently the focus adjustment remain unchanged as a result. Due to the adaptation, the welding head can thus move possibly extensively in parallel to the surface of the workpiece. This happens, e.g., when the welding head within the holding-down device is displaced in one or more directions with a suitable adjusting device. Local tolerances in the workpiece surface can be equalized at least partially.

The welding device according to the present invention is preferably designed as a laser welding or laser cutting device. However, it may also be designed as another welding or cutting device, which operates with a holding-down device and optionally with a pressure pad. However, special advantages arise in the case of a laser welding device, in which the holding-down device and the laser head cooperate in a particular manner.

The present invention suggests various possibilities of designing the equalizing device. In the preferred embodiment, the equalizing device has a drag bearing with at least one pivot axis. As a result, it is possible to automatically adapt the holding-down device and/or the pressure pad to the surface of the workpiece by an equalizing rotary movement during the feed.

An especially advantageous embodiment of the drag bearing and of the mounting bracket of the welding device is preferably provided where the drag beating has one or more rails and at least one beating cap with a plurality of rolling bodies arranged in an arc between the rails and the bearing cap. The rails can be arranged on the mounting bracket and the bearing cap can be arranged on the holding-down means. A welding device focus can also be provided where the arc of the rolling bodies and the rail is curved around the focus.

In a variant of this, the equalizing device may also have a plurality of sensors for determining angle errors. The sensors may have different designs, and force and pressure sensors or distance sensors are available. The angular position can be corrected via an independent drive of the welding device, which is integrated, e.g., in the mounting bracket. As an alternative, the sensor signals may also be sent to the manipulator control, so that the correcting movement takes place via the hand of the manipulator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In
the drawings:

FIG. 3 is a schematic sectional view through the welding device according to FIG. 1 along the intersecting line III—III; and FIG. 4 is a schematic sectional view through the welding device according to FIG. 2 along the intersecting line IV—IV.

DESCRIPTION OF THE PREFERRED EMBODIMENT

Figure 1:
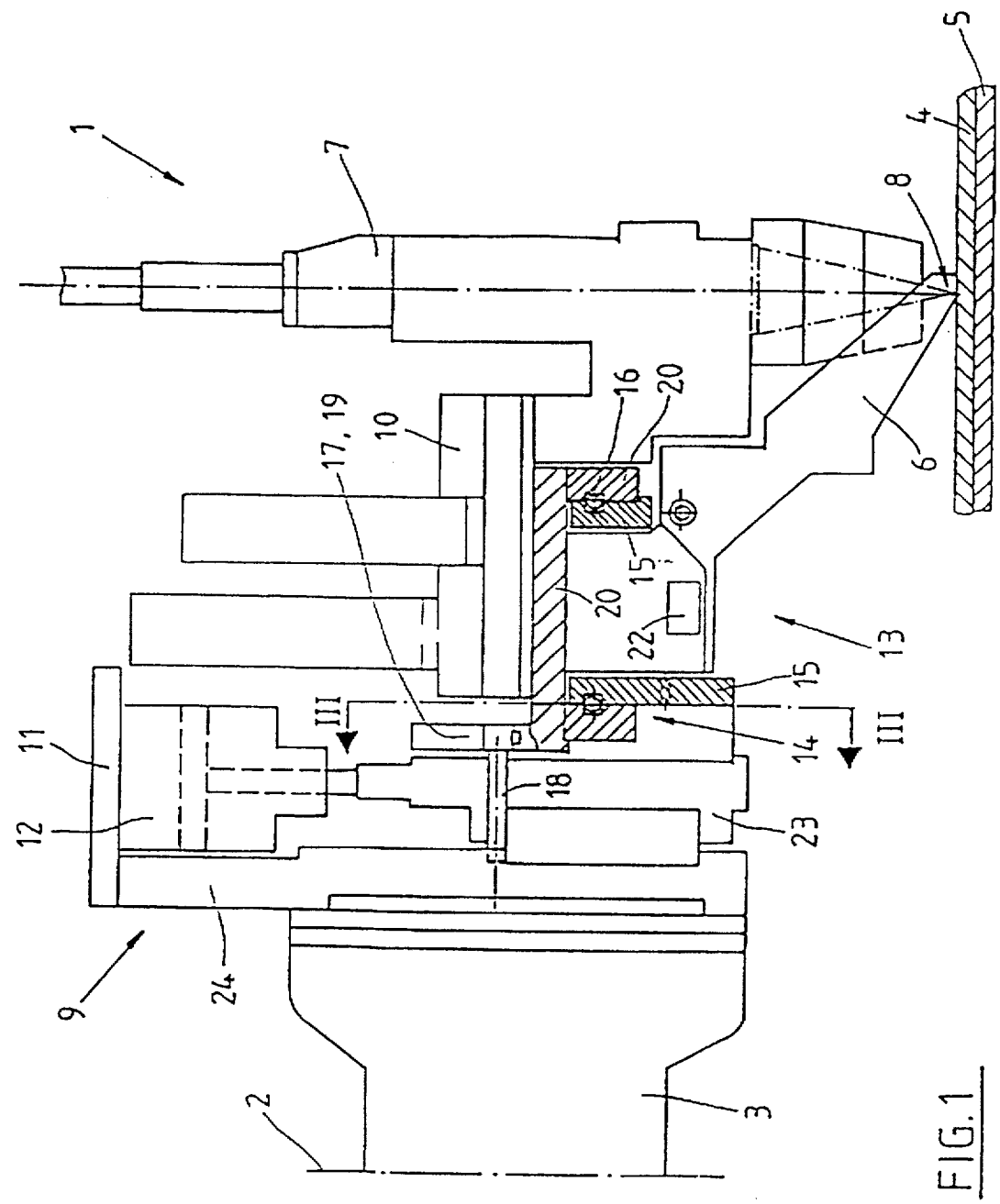
FIG. 1 is a schematic side view of the manipulator-guided welding device with an equalizing device designed as a drag bearing.

The drawings show a welding device 1, which is preferably designed as a laser welding device. It is guided by a manipulator 2, which is preferably designed as a multiaxial industrial robot and has a multiaxially movable hand 3. In the exemplary embodiment shown, the welding head 7 is designed as a laser head, which is fastened to the hand 3 by means of a multi-pan mounting bracket 9. The laser head 7 is surrounded by an essentially fork-shaped or ting-shaped holding-down device 6 and is arranged therein preferably in a centered manner. A pressure pad (not shown) may also be arranged on the underside of the mounting bracket 9.

For welding, the holding-down device 6 is pressed against the workpiece 4. The workpiece 4 is, e.g., a sheet metal. If a plurality of workpieces 4, 5 or pieces of sheet metal are to be welded together, a fixed counteracting stop or a pressure pad may come into action from the opposite side. The pieces of sheet metal 4, 5 are pressed together between the holding-down device 6 and the pressure pad during the welding process.

The welding device 1 is fed via the manipulator 2, which preferably has a continuous-path control. The welding device 1 may have an independent control, which may, however, also be integrated within the manipulator control as an alternative. As a result, the welding process takes place automatically. A plurality of welding spots or welding joints are applied to the workpieces 4, 5 with the laser head 7, while the welding device 1 is displaced from one spot to the next.

Angle errors may develop between the holding-down device 6 and the surface of the workpiece 4 during the manipulator-guided feed. This happens, e.g., if the workpiece 4 is warped or has an inherently curved shape. Angle errors may also develop between the pressure pad and the workpiece 4, 5. Angle errors are usually more disadvantageous for the holding-down device 6 because of its essentially ring-shaped contact surface. The holding-down device 6 does not have to have a closed fork shape or ring shape on the contact or footprint surface on the workpiece 4, but it may consist of a plurality of correspondingly arranged feet or webs with spaces between them.

An equalizing device 13 is provided for determining and correcting angle errors. Various embodiments are shown for this in FIGS. 1 and 2 as well as 3 and 4.

If another welding or cutting technique, e.g., TIG welding, is used, the welding head has a correspondingly different design. The following explanations given for the welding device 1 and for the equalizing device 13 apply to this analogously.

In the exemplary embodiments shown, the equalizing device 13 consists of a drag bearing 14. This drag bearing makes it possible for the holding-down device 6 to automatically rotate into the correct pressing position against the workpiece 4 during pressing. The drag bearing 14 is uniaxial in the embodiment shown, but it may also be designed as a multiaxial bearing, especially as a cardanic drag bearing. The holding-down device 6 now preferably rotates around the focus 8 of the laser head 7.

The drag bearing 14 is designed as a double bent ball bearing in FIGS. 1 and 3. It has for this a bent arrangement of a row of rolling bodies 16, preferably balls, which are arranged between a relatively stationary rail 15 associated with the mounting bracket 9 and a bearing cap 20 of the holding-down device 6 extending over this rail 15.

Figure 2:
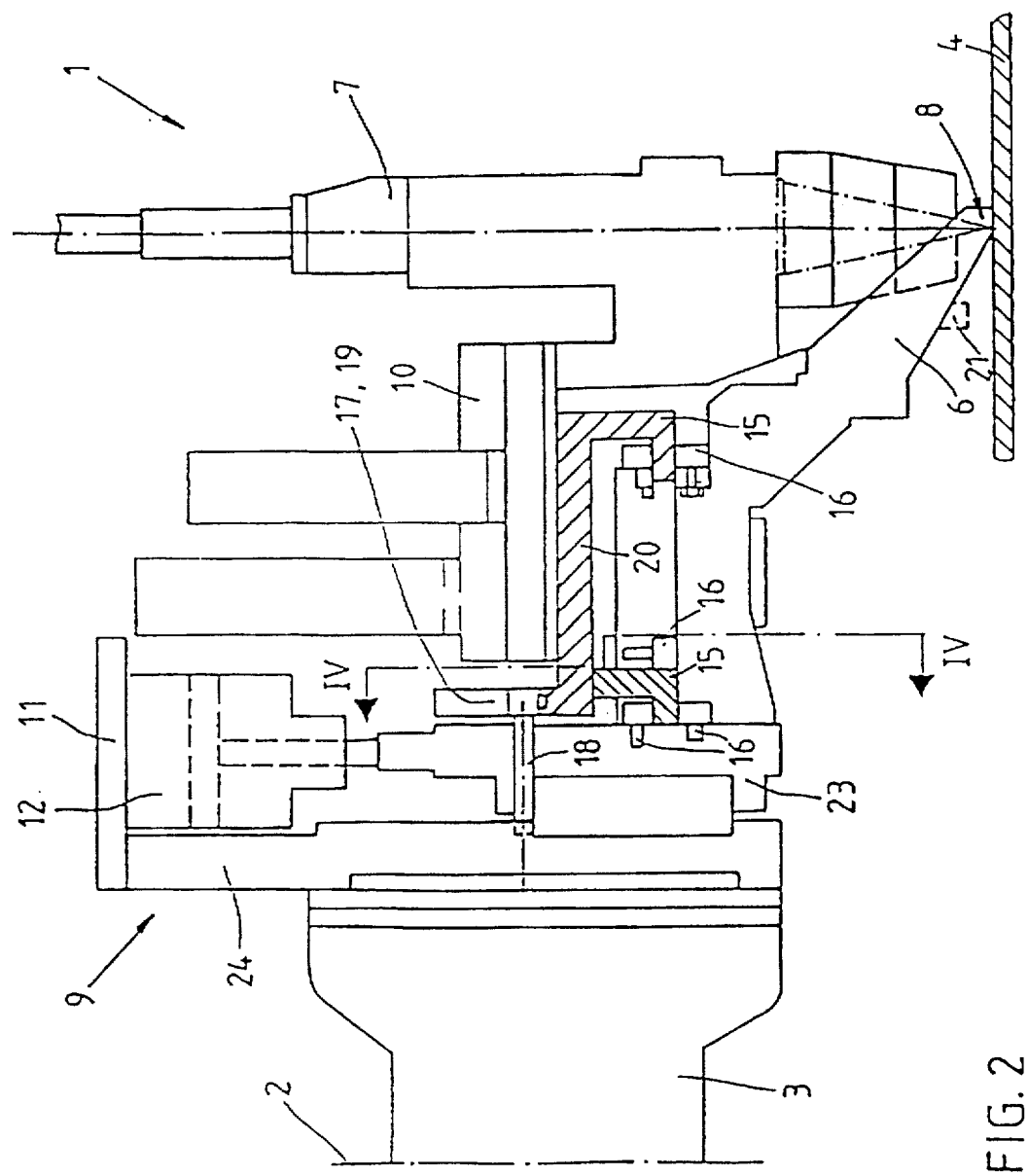
FIG. 2 is a schematic variant of the equalizing device according to FIG. 1 with another drag bearing.

In FIGS. 2 and 4, the drag bearing 14 has two bent rails 15, which have a top side and an underside which extend in parallel to one another. The rails 15 are this time connected to the holding-down device 6 via a suitable beating cap 20. Rolling bodies 16, which are mounted on the mounting bracket 9 and are preferably designed as rollers, act on the top side and the underside of the rail. The curved rails 15 are pivotably mounted on the rolling bodies 16, which are likewise arranged in an are. One or more rollers may be additionally provided as a side guide.

The arc-shaped arrangement of the rails 15 or rolling bodies 16 is preferably curved around the focus 8 of the laser head 7 as a center. In the welding position, the focus 8 is usually located on the surface of the workpiece 4 and in the center of the ring-shaped or fork-shaped contact surface of the surrounding holding-down device 6. Pivoting the holding-down device 6 around the focus 8 is favorable for a uniform and essentially central pressing around the welding spot. As an alternative, it is, however, also possible to use another center of curvature or pivoting, which is preferably also located on the surface of the workpiece.

In both embodiments, the rolling bodies 16 act on the rails 15 or on the bearing cap 20 such that only one possibility of pivoting is given, and the holding-down device 6 is otherwise guided in a positive-locking manner and is raised and lowered and laterally displaced with the laser head 7. A multiaxial drag bearing 14 may also be designed analogously.

One or more spring-loaded balls (not shown) may be integrated in the lower edge of the holding-down device 6. The balls reduce the friction between the holding-down device 6 and the workpiece 4 and facilitate the equalization of the angles. Damage to the workpiece 4 is avoided at the same time. The spring excursion of the balls is so great that the balls can disappear in the holding-down device 6 during pressing.

The laser head 7 is preferably connected directly to the mounting bracket 9 independently from the holding-down device 6. This may be a rigid connection. An adjusting device 10 for uniaxially or multiaxially changing the position of the laser head within the holding-down device 6 may also be present as an alternative. In the exemplary embodiment shown, the adjusting device 10 comprises a cross slide with horizontal and vertical axes along with suitable drives. The laser head 7 can be adjusted in relation to the robot hand 3 and the holding-down device 6 via the adjusting device 10. As an alternative, the adjusting device 10 may also have only one axis. Depending on the design of the welding device 10, it may also be eliminated altogether.

In the exemplary embodiment shown, the mounting bracket 9 is a multi-part bracket and has a pressing device 11 and the above-mentioned adjusting device 10. The pressing device 11 is arranged close to the hand 3 and has an at least uniaxially movable slide 23, which is mounted on a frame 24 connected to the hand 3. The slide 23 is displaceable against the force of a resetting spring 12. The spring 12 may be designed as a mechanical compression spring, as a pneumatic spring, or in another suitable manner.

The adjusting device 10, on which the laser head 7 is in turn suspended, is arranged on the slide 23. The two rails 15, on which the holding-down device 6 is suspended via the rolling bodies 16 and the surrounding bearing cap 20, are also fastened to the slide 23 in FIGS. 1 and 3. The rolling bodies 16, on which the rails 15 connected to the holding-down device 6 are guided, are mounted on the slide 23 in FIGS. 2 and 4.

The axis of movement of the slide and of the spring 12 is preferably parallel to the longitudinal axis of the laser head 7 and of the holding-down device 6 and consequently also parallel to the normal direction of feed. The holding-down device 6 is moved against the workpiece 4 during the feed of the welding device 1, and the feed motion of the manipulator 2 is still continued by a certain amount after contact has been established. The spring 12 acting in the direction of the feed motion in the pressing device 11 is now tensioned, and the holding-down device 6 is pressed against the workpiece 4 with a spring force corresponding to the feed travel or tensioning travel.

The equalizing device 13 has a centering device 17 for the holding-down device 6. In both embodiments shown, a centering strap 19, which has an essentially triangular top view and whose upper tip is engaged by a retention pin 18, is arranged for this purpose on the horizontal web of the bearing cap 20. Addition pins may also engage flankingly on the side. The centering strap 19 stands essentially vertically and extends in parallel to the axis of movement of the slide 23.

The retention pin 18 is stationarily connected to the frame 24 of the mounting bracket 9 such that it does not move during the centering movement of the pressing device 11. As a result, the centering strap 19 coupled with the pressing device 11 comes out of contact with the retention pin 18 when the holding-down device 6 is being pressed onto the tip of the strap and is able to rotate together with the holding-down device 6. However, the rotary mobility is limited by a lateral stop of the centering strap arms at the retention pin 18.

When the holding-down device 6 is separated from the workpiece 4, the retention pin 18 and the tip of the strap come again into contact, as a result of which the centering strap 19 is again caught and centered.

As is illustrated in FIG. 1, the holding-down device 6 may comprise two collapsible parts, which are moved at least by a small amount in relation to one another during the pressing on of the holding-down device 6. A sensor 22 picking up force, tension or pressure, which measures the pressing force applied by the holding-down device 6 to the workpiece 4 and sends it to the control unit of the manipulator 2, may be arranged between them. The pressing force can be controlled by the feedback (from the sensor 22 to the control unit).

In an exemplary embodiment that is not shown, a pressure pad is fastened to the underside of the mounting bracket. It may also have an equalizing device in the form of a drag bearing or in another suitable form. The pressure pad has, e.g., cylinder-actuated, pivotable tongs, which can be pressed against the underlying workpiece 5 from below centrally to the holding-down device.

In a variant of the equalizing device 13, a plurality of sensors 21 are arranged at the lower edge of the holding-down device 6. They may be integrated in the wall of the holding-down device 6 or be fastened on the outside. FIG. 2 shows a possible arrangement at the holding-down device 6 by broken lines. The sensors 21, 22 may be used alternatively or combinatively.

The sensors 21 are, e.g., distance-measuring sensors. They determine whether there is a contact between the holding-down device 6 and the workpiece 4 and whether a space is still present in oblique positions. However, as an alternative, they may also be force or pressure sensors, which are preferably integrated in the contact surface of the holding-down device 6. The sensors 21 measure the pressure occurring locally during the pressing on of the holding-down device 6 and determine, in conjunction with a suitable control unit, whether there are differences in pressure and consequently angle errors or not. The sensors 21 are preferably distributed uniformly around the holding-down device 6. Four or more sensors 21 are preferably used.

The evaluation of the sensor signals is performed in a suitable control unit. This unit may be integrated in the welding device 1. It is also recommended in this case to perform the correction of the angle errors by suitable actuating drives within the welding device 1 (not shown). The actuating drives rotate the holding-down device 6 and optionally also the pressure pad until the sensors 21 report a uniform contact pressure on the workpieces 4, 5.

As an alternative, the sensor signals may also be reported to the control unit of the manipulator 2. The correction of the angle errors is now performed by a corresponding rotation of the hand 3.

If force or pressure sensors 21, 22 are used, it is also possible to control and regulate the pressing force, in addition to the angle error correction. The sensor signals are evaluated for this purpose not only relative to one another, but also absolutely for measuring the pressing force or the pressing pressure. The manipulator control can then adjust the welding device 1 to achieve the desired pressing force.

In a modification of the exemplary embodiments described, the laser head 7 may be coupled with the holding-down device 6, so that it also moves during the equalizing movement. The focus 8 remains on the workpiece surface as a result. The connection to the holding-down device 6 may be rigid. As an alternative, it is also possible to connect the uniaxial or multiaxial adjusting device 10 to the holding-down device 6 by placing it, e.g., on the bearing cap 20. The laser head 7 can then be displaced within the holding-down device 6, while it moves extensively in parallel to the workpiece surface due to the angle equalization.

Other variants of the exemplary embodiments shown are possible. On the one hand, the drag bearing 14 may consist of a universal joint, which is arranged within or outside the holding-down device 6. It may also be a steering mechanism with one or more connecting rods and a corresponding number of axes. The kinematic association of the rails 15 and rolling bodies 16 with the holding-down device 6 or with the slide 23 may be reversed compared with the exemplary embodiments according to FIGS. 1 and 2.

Furthermore, other suitable types of sensors may be used instead of the sensors described.

LIST OF REFERENCE NUMBERS

1 Welding device
2 Manipulator, industrial robot
3 Hand
4 Workpiece, sheet metal
5 Workpiece, sheet metal
6 Holding-down device
7 Welding head, laser head
8 Focus
9 Mounting bracket
10 Adjusting device, cross slide
11 Pressing device
12 Spring, cylinder 13 Equalizing device
14 Drag bearing
15 Rail
16 Rolling body
17 Centering device
18 Retention pin
19 Centering strap
20 Bearing cap
21 Sensor, distance measurement
22 Sensor, force/pressure measurement
23 Slide
24 Frame

I claim:

1. A device for welding and/or cutting, comprising:

a welding head;

holding-down means, partially surrounding said welding head, for pressing on a workpiece;

a manipulator including a manipulator hand;

a mounting bracket connected to said manipulator hand, said welding head and said holding-down means being connected to said manipulator hand via said mounting bracket;

equalizing means connected to said welding device for determining angle errors between said workpiece and said holding-down means, and for correcting said angle errors between said workpiece and said holding-down means.

2. A device according to claim 1, wherein said equalizing means includes a drag bearing having at least one axis.

3. A device according to claim 2, wherein said drag bearing has one or more rails and at least one bearing cap with a plurality of rolling bodies arranged between said rails and said bearing cap, in an arc.

4. A device according to claim 3, wherein said rails are arranged on said mounting bracket and said bearing cap is arranged on said holding-down means.

5. A device according to claim 3, wherein said rail is connected to said holding-down means and said rolling bodies are connected to said mounting bracket.

6. A device according to claim 3, wherein a welding device focus is provided and said arc of said rolling bodies and said rail is curved around said focus.

7. A device according to claim 2, wherein said drag bearing includes at least one bent rail guided on a plurality of rolling bodies.

8. A device according to claim 2, wherein said drag bearings are designed as a steering mechanism.

9. A device according to claim 1, wherein said mounting bracket includes a spring-loaded pressing device.

10. A device according to claim 9, further comprising a uniaxial adjusting device arranged between said welding head and said pressing device.

11. A device according to claim 1, wherein said equalizing means includes a centering device.

12. A device according to claim 11, wherein said centering device includes a centering strap connected to said holding-down means and at least one retention pin arranged relatively stationarily on said mounting bracket.

13. A device according to claim 1, wherein said holding-down includes a sensor for measuring pressing force.

14. A device according to claim 1, wherein said equalizing means includes a plurality of sensors for determining angle errors.

15. A device according to claim 14, further comprising a separate correcting drive connected to said device for welding and/or cutting, said separate correcting drive being connected to said sensors for compensating for determined angle errors.

16. A device according to claim 14, wherein said sensors are connected to a control unit of said manipulator.

17. A device according to claim 1, wherein said welding head is a laser welding head.

* * * * *